L. C. NICOSON.
ADJUSTABLE AUTOMOBILE HOLDER.
APPLICATION FILED AUG. 30, 1916.
1,291,610.
Patented Jan. 14, 1919.
2 SHEETS—SHEET 1.
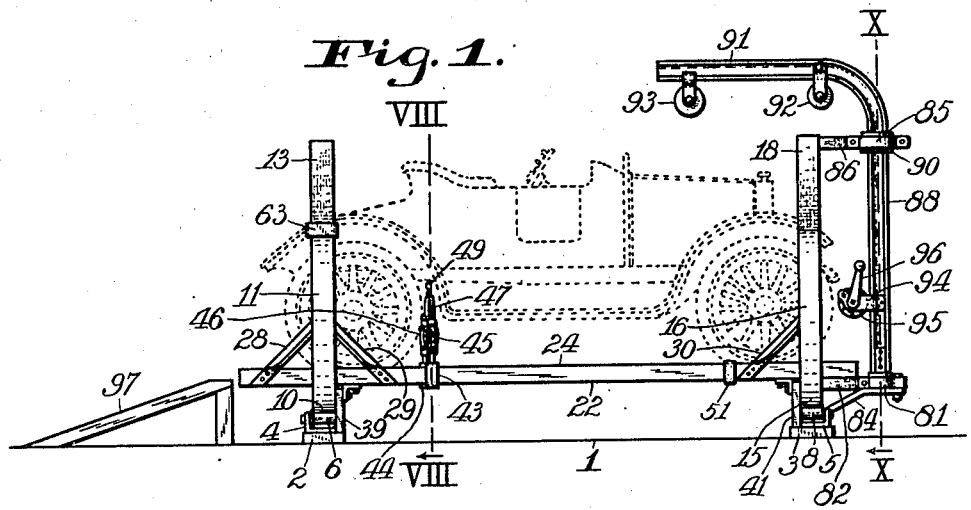
Fig. 1.
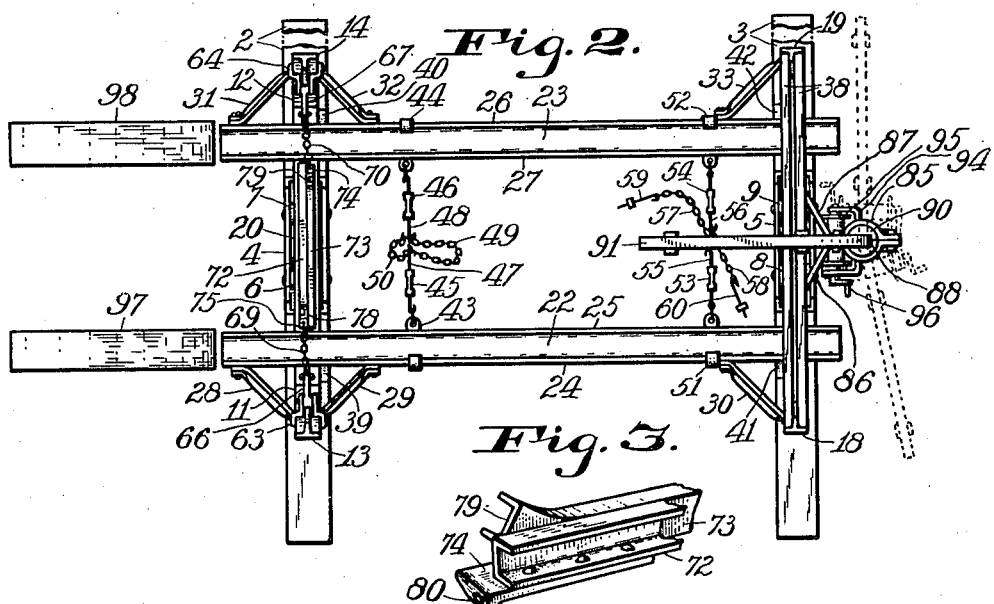
Fig. 2.
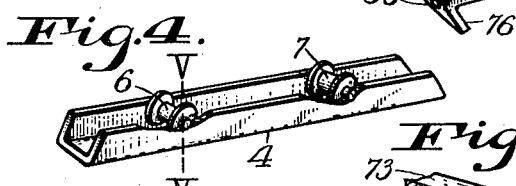
Fig. 3.
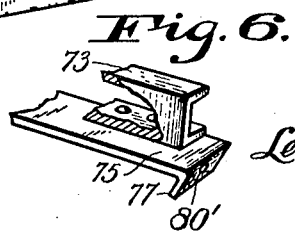
Fig. 4.
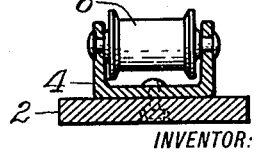
Fig. 5.
Fig. 6.
WITNESSES:
J. H. Gardner.
Myrtle McCoy.
INVENTOR:
Lemuel C. Nicoson.
BY
E. T. Silvius,
ATTORNEY.

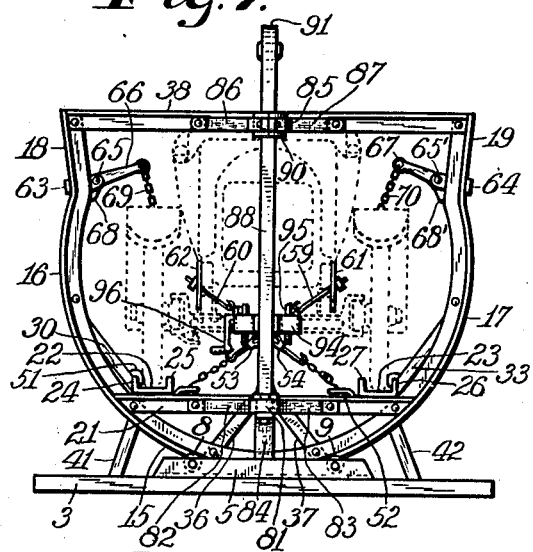
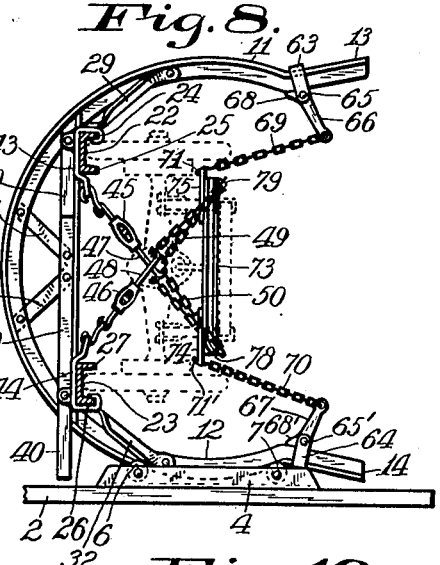
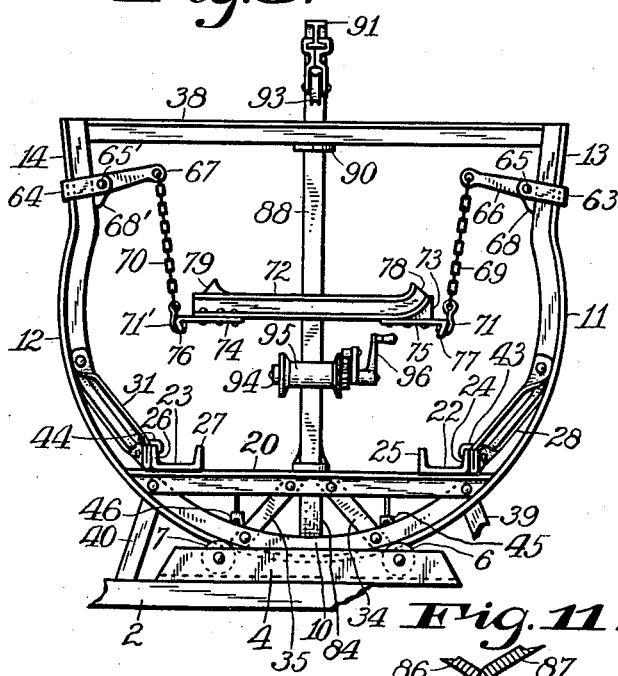
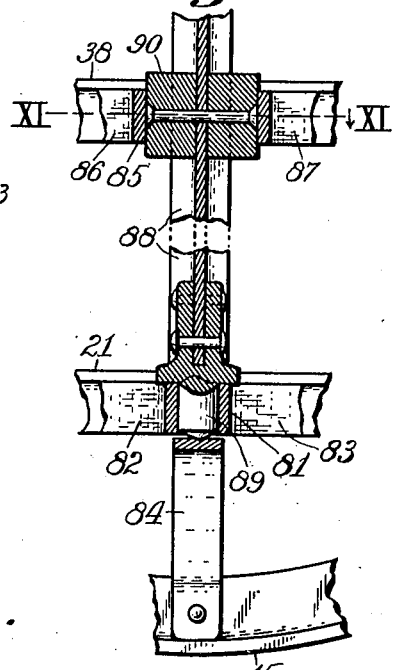

UNITED STATES PATENT OFFICE.

LEMUEL CLAY NICOSON, OF ALEXANDRIA, INDIANA.

ADJUSTABLE AUTOMOBILE-HOLDER.

1,291,610. Specification of Letters Patent. Patented Jan. 14, 1919.

Application filed August 30, 1916. Serial No. 117,777.

*To all whom it may concern:*

Be it known that I, LEMUEL CLAY NICOSON, a citizen of the United States, residing at Alexandria, in the county of Madison and State of Indiana, have invented a new and useful Adjustable Automobile-Holder, of which the following is a specification, reference being had to the accompanying drawings and to the letters and figures of reference marked thereon.

This invention relates to improvements in an adjustable motor-vehicle holder of the type that is disclosed in my prior application for Letters Patent filed April 24, 1916, Serial No. 93,239, the present application for Letters Patent being a continuation of said prior application in so far as the subject-matter is common to both applications.

An object of the invention is to provide a holder for motor-vehicles that shall be so constructed as to be capable of turning a vehicle over to enable a workman to have access to the under parts thereof and in the minimum amount of space for operation of the holder. Another object is to provide improved means for securing a vehicle to the holder. A further object is to provide improved means for supporting the body of the vehicle in the holder while the running gear or parts thereof are removed from the vehicle-body. A further object is to provide a vehicle-holder of such construction as to permit it to be easily rotated to a limited extent with a vehicle thereon. A still further object is to provide an improved motor-vehicle holder that shall have means embodied therein for lifting or handling the motor or heavy parts of the machinery thereof when the motor-vehicle is in the holder and in either normal or tilted position, the lifting means to be adaptable for drawing the motor-vehicle into the holder.

With the above-mentioned and other objects in view, the invention consists in an improved open work or hollow cradle-like skeleton frame having supporting rollers on which the frame may be turned as about an axis, the frame being adapted to hold and turn a vehicle over sidewise, the frame being provided with a crane adapted for lifting or pulling; and, the invention consists also further in the novel parts and combinations and arrangements of parts as hereinafter particularly described and further defined in the appended claims.

Referring to the drawings, Figure 1 is a side elevation of the improved holder and an automobile shown by broken lines therein; Fig. 2 is a top plan of the improved holder; Fig. 3 is a fragmentary perspective view of an extensible or contractible beam whereby to support a portion of the vehicle body; Fig. 4 is a perspective view of one of the bases of the holder; Fig. 5 is a transverse section of the base on the line V—V of Fig. 4; Fig. 6 is a fragmentary perspective view of the beam structure above referred to; Fig. 7 is an elevation of the improved holder in which an automobile shown by broken lines is arranged in normal position; Fig. 8 is a sectional elevation on the plane of the line VIII—VIII of Fig. 1, the holder and the automobile being turned over from normal position; Fig. 9 is an end elevation of the improved holder opposite to that shown in Fig. 7; Fig. 10 is a fragmentary section on the line X—X of Fig. 1, and Fig. 11 is a fragmentary section on the line XI—XI of Fig. 10.

On the various figures of the drawings similar reference characters indicate like parts or features of construction herein described.

The improved holder is permanently arranged in a shop, a garage or elsewhere as may be desired, the numeral 1 on the drawings indicating the floor or ground line on which the holder is supported. The frame of the improved holder comprises two main frame members that are spaced apart and composed of metal such as T-section iron or steel bent to the required shape. Each of the main members is formed so as to conform to a segment of a circle so as to be adapted to be easily rolled, being approximately U-shaped, but each is provided with a supporting base having rollers on which the member may be turned within the space it normally occupies, and for this purpose two base timbers 2 and 3 preferably are provided and placed upon the floor 1, two metallic channel-iron bases 4 and 5 being secured upon the timbers in appropriate arrangement.

The base 4 is provided with two flanged rollers 6 and 7 suitably spaced apart to support one of the main members at two points, the other base 5 being provided with similar rollers 8 and 9 to support the other one of the two main frame members. One of the frame members has a curved base portion 10 and continuing curved side portions 11 and 12 having preferably straight upper portions 13 and 14 respectively that preferably extend divergently upwardly. The other frame member has a curved base portion 15 and curved side portions 16 and 17 that have preferably straight upper portions 18 and 19 respectively. A girder 20 is secured to the curved lower side portions of one of the frame members, a similar girder 21 being likewise secured to the other one of the frame members, the girders preferably being built up of separate parts. Two track rails 22 and 23 are secured to the tops of the girders adjacent to the side portions of the frame members and constitute stringers to tie the frame members together. One of the rails preferably has a guide flange 24 upon one side portion thereof and preferably a similar flange 25 on the opposite side portion, the other rail having similar flanges 26 and 27 thereon. The holder is provided with a suitable number of frame braces, there being preferably two braces 28 and 29 secured to the rail 24 at a distance from the girder 20 and extending upwardly and outwardly to the adjacent curved portion 11 of one frame member and secured thereto, another brace 30 being secured to the rail and extending upwardly and outwardly to the curved portion 16 of the other frame member. The braces are conveniently secured to the rail preferably to the outer one of the flanges of the rail. Other braces 31 and 32 are likewise secured to the rail 23 and to the curved portions 12, another brace 33 being secured also to the rail and to the curved portion 17. Two braces 34 and 35 are secured to the middle portion of the girder 20 and extend downward divergently and are secured to the base portion 10 of one of the frame members, similar braces 36 and 37 being secured to the girder 21 and to the base portion 15 of the other main frame member. A cross-bar 38 is secured to the upper side portions 18 and 19 of one of the main frame members. In order to prevent the vehicle holder from rolling or rocking it is provided with pivoted props 39 and 40 that are connected with one of the frame members adjacent to the respective ends of the girder 20, and similar props 41 and 42 connected with the opposite frame member adjacent to the respective ends of the girder 21. The props may conveniently be connected with the track rails adjacent to the girders and frame member portions.

Provision is made for securely fastening an automobile or other vehicle to the track rails, a pair of grab-irons 43 and 44 being provided which are adapted to engage the bottom and outer side of a rail and also the top or the outer flange of the rail, the grab-irons being provided respectively with suitable stay chains preferably comprising turn buckles 45 and 46 suitably linked to the grab-irons respectively, and hooks 47 and 48 connected to the turn buckles and to which chains 49 and 50 are respectively connected to be connected to convenient rear portions of the automobile or frame thereof. Other similar grab-irons 51 and 52 are similarly connected to the track rails respectively and have turn buckles 53 and 54 connected thereto respectively, hooks 55 and 56 being connected to the turn buckles respectively. Chains 57 and 58 are connected to the hooks 55 and 56 respectively and have hook bolts 59 and 60 connected thereto that are connected when in use to washer plates 61 and 62 respectively that are adapted to be placed against the outer side of the forward springs and frame bars, with the hook bolts arranged between the springs and frame bars, to secure the forward portion of the automobile to the track rails.

For the purpose of supporting a portion of the automobile or its body while removing an axle, two yokes 63 and 64 are provided which movably embrace the side portions 13 and 14 respectively of a main frame member and are provided with pivots 65 and 65′ respectively adjacent to the inner sides of said side portions, whereby to adjustably support two arms 66 and 67, which are connected to the pivots and have heels 68 and 68′ respectively that normally bear against the adjacent portions of the frame members and adjustably lock the yokes thereto. Two chains 69 and 70 are connected to and suspended on the arms and preferably are provided on their ends with hooks 71 and 71′ respectively, the chains being adapted to be connected to various parts of the automobile or vehicle. Preferably a longitudinally extensible or contractible beam is provided to be supported by the chains and comprises two channel iron bars 72 and 73 arranged back to back, one end portion of the bar 72 having a guide plate 74 secured to the under side thereof and extending under the adjacent end portion of the bar 73, a guide plate 75 being secured to the under side of the opposite end portion of the bar 73 and extending under the adjacent end portion of the bar 72. The guide plates have their outer end portions bent downward to form lugs 76 and 77 respectively adapted to be engaged by the hooks of the chains. One end portion of the bar 72 is bent upward to form a lug 78, the opposite end portion of the bar 73 being bent upward to form a lug 79, the lugs being adapted to be engaged by the stay chains while the chains embrace the adjacent bars, or the lugs may be brought into contact with the automobile frame when the beam is adjusted under the frame. Preferably the lugs 76 and 77 have apertures 80 and 80′ therein to receive the hooks 71 and 71′ respectively.

In order that the engine or motor or other heavy parts of the vehicle may be readily lifted, the holder is provided on one end thereof with a crane conveniently arranged and suitably supported near the position occupied by the forward portion of the automobile when in the holder. For this purpose a step-bearing 81 is provided which has arms 82 and 83 that are secured to the girder 21 and a brace 84 that is secured to the base portion 15 of the main frame member adjacent to which the crane is arranged. A journal box or guide 85 is arranged above the step-bearing and provided with arms 86 and 87 that are secured to the cross-bar 38. A crane mast 88 is vertically arranged and has a journal 89 that is supported in the step-bearing 81, the mast being provided also with a collar 90 that forms a journal member which is arranged in the guide 85, the mast preferably being rotatable and having an arm 91 thereon that extends above the plane of the track rails and so as to swing over the forward portion of the automobile, the arm preferably supporting two sheaves 92 and 93 over which a hoisting cable may operate, the cable to be operated by a windlass comprising a frame 94 secured to the mast 88 and a spool or winding drum 95 rotatably mounted in the frame and provided with a crank arm 96. The windlass is arranged conveniently near to the track rails to permit it to wind up a cable which may be connected to an automobile to draw the latter up to the track rails when the automobile holder is not arranged in a pit, and inclined tracks or runways 97 and 98 are arranged at the opposite ends of the track rails.

In practical use a vehicle is run onto the track rails when the vehicle holder is in upright or normal position, the vehicle usually being run on head first so as to bring the engine or motor in proximity or adjacent to the crane. The automobile or other vehicle may be firmly secured to the track rails by means of the devices provided for the purpose, in case it is desired to tilt or turn over the vehicle in order to make repairs to under portions thereof, or the vehicle may be secured in position by various means. The appliances for supporting the body of the vehicle are used as may be most convenient, the adjustable beam to be supported by the chains 69 and 70 being placed under the vehicle frame where most convenient. The props may be readily shifted on their pivots and the holder turned over on its rollers without requiring great exertion, and is readily returned to normal position. The manner of using the crane will be readily suggested by the needs thereof in making quick repairs to the machinery of the automobile, or for over-balancing, balancing, or for turning the holder, and the purposes and functions of the various other parts or features of the automobile holder will be readily understood from the description thereof without further explanation.

Having thus described the invention, what is claimed as new is—

1. A skeleton motor-vehicle holder including two frame members spaced a distance apart and having each a curved base portion and two curved side portions, each side portion having a straight upper portion, two track rails supported adjacent to their ends by the curved side portions of the frame members, and two chains having supporting arms adjustably connected with the upper side portions respectively of one of the frame members.

2. A motor-vehicle holder including two frame members having curved lower side portions, one of the members having two straight upper side portions, two track rails supported by the lower side portions of the frame members, two arms adjustably connected to the inner sides of the upper side portions respectively of the frame member, and two chains connected to the two arms respectively.

3. A motor-vehicle holder including two frame members having curved lower side portions, each member having two straight upper side portions, two track rails supported by the lower side portions of the frame members, a cross-bar connected to the upper side portions of one of the frame members, and two chains adjustably connected to the upper side portions respectively of the remaining one of the frame members.

4. A motor-vehicle holder including two frame members having curved lower side portions, one of the members having two straight upper side portions, two track rails supported by the lower side portions of the frame members, two chains adjustably connected to the upper side portions respectively of the frame member, and a longitudinally extensible or contractible beam detachably connected at its ends respectively to the two chains.

5. A motor-vehicle holder including two frame members, each member comprising two curved side portions, two girders secured to the curved side portions of the frame members respectively, two track rails secured upon the girders and having each a guide flange upon the outer edge thereof, a plurality of grab-irons adapted to engage the under side of the rails and also the top of the flange of the rail, and a plurality of stay-chains connected to the grab-irons respectively.

6. A motor-vehicle holder including two frame members comprising each a base portion and two curved side portions, two girders secured to the side portions of the frame members respectively, one of the girders having a step-bearing thereon, two track rails secured upon the girders to support the motor-vehicle, a cross-bar secured to the side portions of one of the frame members above the girder that has the step-bearing, the cross-bar having a guide box thereon, and a crane mounted in the step-bearing and the guide box to lift various parts of the motor vehicle.

7. In a motor-vehicle holder, the combination of a hollow skeleton frame comprising two rollable main members spaced apart and two track rails rigidly connected adjacent to their ends with the main members and supported thereby, the rails being adapted to support the motor-vehicle, one of the main members being structurally continuous and open to receive a portion of the motor-vehicle therein, and means connected with the continuous main member of the frame to lift various parts of the motor-vehicle.

8. In a vehicle-holder, the combination with a rollable frame, and two track rails secured to the frame, of a plurality of arms vertically-adjustable on the frame above the plane of the track rails, chains suspended on the arms respectively, and a beam adapted to be suspended on the chains.

9. In a vehicle-holder, the combination with two rollable frame members, one of the members having straight upper side portions, and track rails supported by the frame members, of a plurality of supporting arms provided each with a yoke, each one of the yokes being adapted to be adjustably supported by either one of the straight upper side portions of the frame member, and two chains connected to the arms respectively.

10. In a vehicle-holder, the combination of two rollable frame members spaced a distance apart, one of the members having a girder provided with a step-bearing and having also a cross-bar above the girder provided with a journal box, a girder secured to the other one of the frame members, two track rails secured adjacent to their end portions upon the girders to support the motor-vehicle, and a mast mounted in the step-bearing and the journal box and having means to lift parts of the motor-vehicle or to counter-balance the motor-vehicle on its support.

11. In a vehicle-holder, the combination of two frame members spaced a distance apart and having curved portions, two girders secured to the curved portions of the frame members respectively, two track rails to support the vehicle and secured adjacent to their end portions upon the two girders, rollers relatively supporting said curved portions, and a plurality of braces secured to the track rails and the curved portions of the frame members, each brace extending upwardly and outwardly from the rail to the adjacent curved portion of the frame member, each brace being secured to the rail at a distance from the girder.

12. In a vehicle-holder, the combination with two rollable frame members, and two track rails connected to the frame members, each rail having a guide flange on the outer edge thereof, of a pair of securing appliances comprising each a grab-iron adapted to engage the under side and the outer edge of the rail and also the top of the flange, a turn-buckle linked to the grab-iron, a hook connected to the turn-buckle, and a chain connected to the hook.

13. In a vehicle-holder, the combination of two rollable frame members, each member having a curved portion and two side portions, two girders secured to the curved portions of the frame members respectively, two track rails secured upon the two girders to support the motor-vehicle, a cross-bar secured to one of the frame members above the girder, a guide mounted on the cross-bar, a step-bearing mounted on the girder that is below the cross-bar and having a brace that is connected to the frame member below the girder, and a crane mounted in the step-bearing and the guide to lift various parts of the motor-vehicle.

14. In a vehicle-holder, the combination with a rollable frame having two upwardly-extending side members, and track rails supported by the frame and extending between the side members, of a longitudinally extensible beam to be arranged above the track rails, the beam comprising two bars having each a lug on one end thereof, each bar being provided with a guide coöperating with the other bar, two yokes adjustably arranged on the side members respectively of the rollable frame and having each a pivot, two arms connected to the pivots respectively and having each a heel to engage an adjacent portion of the side member, and two chains connected to the arms respectively and having hooks to engage the lugs respectively of the bars that comprise said beam.

15. In a motor-vehicle holder, a frame comprising two rollable frame members having each a girder to support the motor-vehicle and two stringers secured to the girders, each frame member having upwardly-extending side portions standing each apart from the other, a cross-bar secured to the side portions of one of the frame members and extending over and above the stringers, and means supported by the cross-bar and the adjacent one of the girders to lift various parts of the motor-vehicle.

16. In a motor-vehicle holder, a hollow skeleton frame comprising two rollable frame members having each a girder, and two stringers secured to the girders to support the motor-vehicle, each frame member having curved portions and also upwardly-extending side portions standing each apart from the other, said curved portions supporting the girders, each of the side portions of one of the frame members having an arm on the inner side thereof, and two chains supported on the arms respectively to coöperate to hold a portion of the motor-vehicle.

17. In a motor-vehicle holder, a hollow-skeleton frame comprising two rollable frame members spaced a distance apart and having each a girder, one of the frame members having a cross-bar above the girder, two stringers secured to the girders to support the motor-vehicle, and a crane having connection with the cross-bar and the girder of one of the frame members for support in proximity to one end of the stringers to lift parts of the motor-vehicle.

In testimony whereof, I affix my signature in presence of two witnesses.

LEMUEL CLAY NICOSON.

Witnesses:
KATIE SLOAN,
HARRY M. ADAMS.